United States Patent [19]

Bodovsky

[11] Patent Number: 4,461,633
[45] Date of Patent: Jul. 24, 1984

[54] AIR FILTERING MACHINERY WITH VARIABLE SPEED CLEANING

[75] Inventor: Paul W. Bodovsky, Sherman, Tex.

[73] Assignee: Continental Conveyor & Equipment Co., Inc., Sherman, Tex.

[21] Appl. No.: 425,850

[22] Filed: Sep. 28, 1982

[51] Int. Cl.³ .............................................. B01D 46/04
[52] U.S. Cl. ....................................... 55/283; 55/290; 55/291; 55/294; 55/301; 55/340; 55/352; 55/353
[58] Field of Search ................. 55/215, 272, 283, 290, 55/291, 294, 296, 301, 340, 350–352, 353, 482, 483

[56] References Cited

U.S. PATENT DOCUMENTS

| | | |
|---|---|---|
| 3,373,545 | 3/1968 | Christianson ........................ 55/287 |
| 3,555,785 | 1/1971 | Wooldridge et al. ................ 55/283 |
| 3,628,313 | 12/1971 | Broadbent ............................. 55/283 |
| 4,154,588 | 5/1979 | Herndon, Jr. ......................... 55/283 |
| 4,222,754 | 9/1980 | Horvat ................................... 55/283 |
| 4,226,715 | 10/1980 | Niederer et al. ...................... 55/272 |
| 4,360,369 | 11/1982 | Niederer ............................... 55/283 |

Primary Examiner—David L. Lacey
Attorney, Agent, or Firm—Michael J. Colitz, Jr.; Joseph Januszkiewicz

[57] ABSTRACT

Air filtering apparatus with electric controls for varying the speed of filtering as a function of the contamination within the air being filtered. Pressure sensing devices are provided at the input and output ends of the filtering apparatus. The sensing devices are coupled with the electrical controls to either speed up or to slow down the filter cleaning mechanisms when appropriate.

6 Claims, 5 Drawing Figures

AIR FILTERING MACHINERY WITH VARIABLE SPEED CLEANING

FIELD OF THE INVENTION

This invention relates to air filtering machinery for separating and recovering particles such as dust, fibers and lint from carrier air and, more particularly, to air filtering machinery having automatic electrical controls therefor.

BACKGROUND OF THE INVENTION

The atmosphere in and around textile and related facilities may often carry undesirable particles of dust, fibers and lint. To remove, and in some instances recover, at least a portion of these particles, the air in such facilities must be continuously filtered. Various machines and methods have been designed to eliminate particles of this type from the carrier air in and around such facilities.

One such machine is the commercially available Fibr-A-Filter ® air filtering system sold by the Continental Conveyor and Equipment Company, Inc.. This machine is a primary filter designed to remove and recover fibers and lint from the carrier air in and around textile facilities and to a lesser extent, dust, which may become entrapped within the fibers or lint being removed and recovered from the carrier air. The machine is described in U.S. Pat. No. 4,325,717 to Crowley. Other examples of primary filters are described in U.S. Pat. No. 1,649,220 to Goodloe and in U.S. Pat. No. 3,525,198 to Neitzel. In such primary filters, the larger particles of fibers and lint from the particle-carrying atmosphere being filtered are deposited on the exterior surface of a rotating drum whereafter they can be removed and recovered as bat. A portion of the smaller, undesirable particles, finer dust particles and the like, can move through the rotating drum surface to interior of the drum and be removed from the air filtering machinery for further filtration in a secondary filter. However, a portion of these smaller particles will become entrained in the bat and will be removed therewith.

One example of a secondary filter is the commercially available Intr-A-Vac ® air filtering system sold by the Continental Conveyor and Equipment Company, Inc. Other examples of secondary filters are disclosed in U.S. Pat. No. 3,887,344 to Smith; in U.S. Pat. No. 3,757,496 to Berg; and in United Kingdom Pat. No. 16,392 to Samuleson. In these secondary filters, a cylindrical surface is provided with an interior fur-line covering constituting the filtering media. The air to be filtered is moved to within the interior of the cylindrical surface and through the filtering media to exterior of the surface. The dust particles are then entrapped within the filtering media and the clean air can be vented to exterior of the machinery. A vacuum system within the cylindrical surface is rotated with respect to the cylindrical surface for vacuuming the dust therefrom. This dust ladened air from the vacuum system is moved either to an appropriate settling-type air cleaner or recirculated back into the primary filter for further filtration.

In all of these devices, either primary or secondary filters, an air flow of a first pressure enters the machine and leaves at a second pressure. Further, in all of the devices, movement of mechanical parts occurs between the filtering surface and a debris-removing mechanism. All air filtering machinery of this type are thus adapted to utilize apparatus for controlling the air filtering machinery as a function of the nature and pressure of the air being filtered.

SUMMARY OF THE INVENTION

An object of the instant invention is, thus, to electrically control the speed of the dust, fiber and lint removing mechanisms in automatic air filtering machinery as a function of the nature and quantity of the particles in the air being filtered and pressure of the air being moved, thereby eliminating the need for manual control functions and thereby increasing the efficiency of such filtering machinery. Further, it is an object of the instant invention to maintain constant pressure on the input end of filtering machinery to thereby eliminate varying back pressures on the equipment feeding such filtering machinery with particle-ladened air.

These and other objects of the present invention are obtained by apparatus for sensing the air pressure differential between the input and output ends of automatic air filtering machinery and, means responsive to such differential to modify the speed of the air filtering mechanisms. This will result in improved efficiency of the automatic filtering machinery. The apparatus employed to attain the objectives of the instant invention may be utilized in any primary filter or in any secondary filter or they may be utilized in a tandem system arrangement of a primary filter feeding a secondary filter including with a secondary filter outputting to another device or, in the alternative, recirculating the output of the secondary filter back to the primary filter.

BRIEF DESCRIPTION OF THE DRAWINGS

In the accompanying drawings which illustrate the invention.

DETAILED DESCRIPTION OF THE PREFERRED EMBODIMENT

Figure 1:
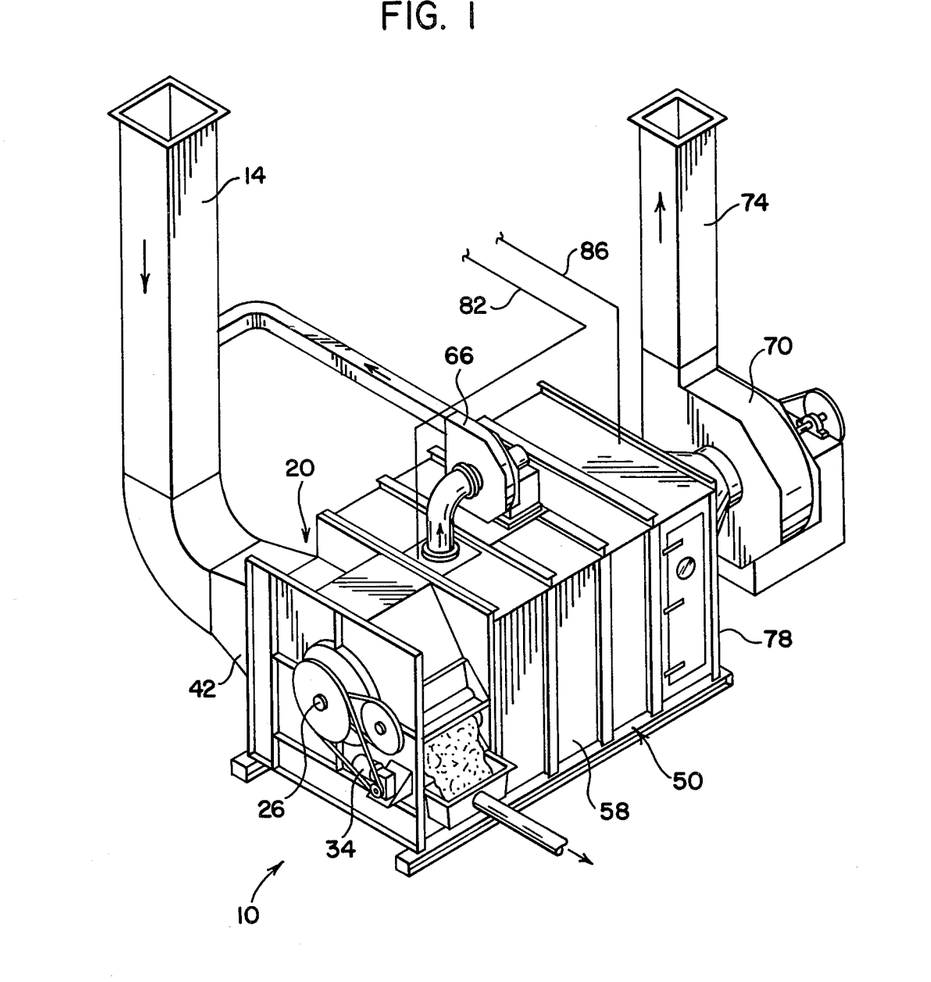
FIG. 1 is a perspective view of an air filtering system employing a primary and secondary filter, each of which is equipped with controlling apparatus constructed in accordance with the instant invention.
Figure 2:
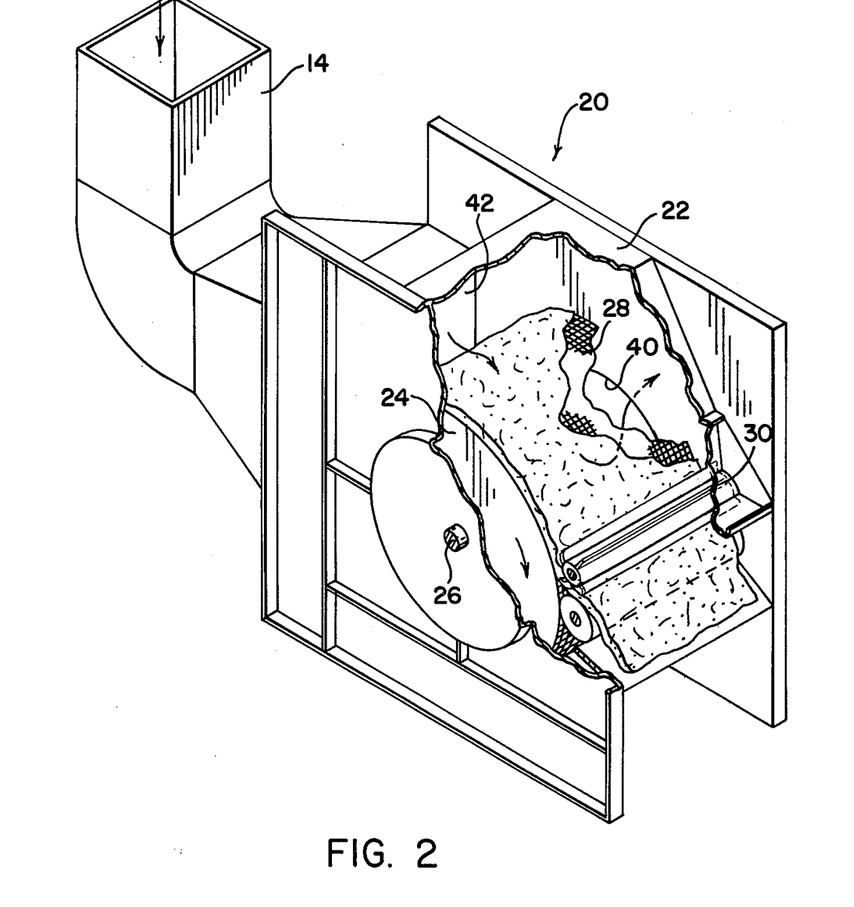
FIG. 2 is an enlarged perspective view of the primary filter as shown in FIG. 1 with parts broken away to show internal constructions thereof.

Referring now to the primary embodiment of the invention as shown in the Figures, the air filtering system 10 is fed with particle-ladened air from the cotton-ginning building or the like through trash line 14. Within the gin building is a gin operator console which includes the control mechanisms, not shown. The trash line from the gin processing machinery constitutes the input to a primary filter 20. The primary filter includes the housing 22 supporting a drum 24 rotatable therein. Trash line 14 introduces the particle-ladened air to the primary filter 20. The particle-ladened air enters the housing 22 to contact the exterior surface of drum 24. The drum 24 is mounted on shaft 26 for rotational movement within the chamber to present new surfaces for being exposed to the incoming particle-ladened air at the input of the primary filter 20. The drum is mounted on rotatable shaft 26 for rotation therewith while the exterior surfaces of the drum is mounted on a screen 28 to permit the passage of air to interior of the drum for removal. The screen size is of such mesh that the larger particles such as lint and fibers will be contained on the exterior surface of the screen for forming a fiber bat. The fiber bat is of such nature that it will normally entrap dust or other fine particles which might otherwise move through the screen to interior of the drum.

As the drum rotates and accumulates bat material formed on its exterior surface through the particle-ladened air, a doffing roller 30 is rotated with the drum for removing the bat from the drum to clean the surface thereof.

Figure 3:
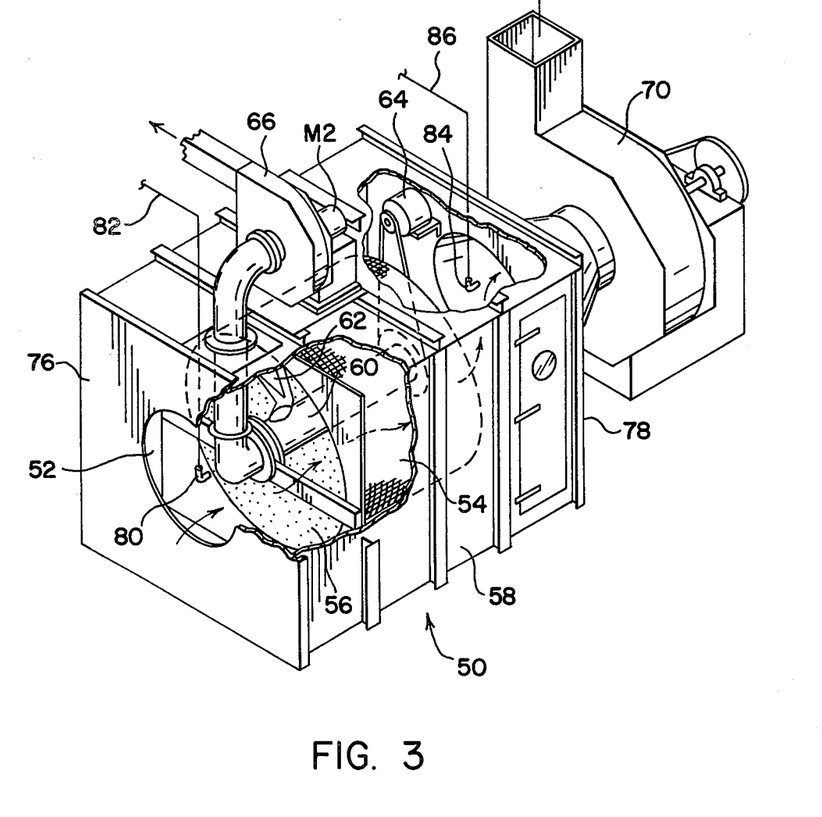
FIG. 3 is an enlarged perspective view of the secondary filter as shown in FIG. 1 with parts broken away to show internal constructions thereof.

The rotation of the cleaning drum and intercoupled doffing roller 30 may be all off of a single, variable-speed drive motor 34 as described in the aforementioned patent to Crowley. The air flow through the primary filter is caused by the high pressure from the trash lines to the input end 42 of the primary filter, and the suction from the output end 40 of the primary filter which feeds directly to, and becomes the input to, the secondary filter 50. The secondary filter 50 receives air ladened with dust or other minute particles of fiber or lint from the primary filter at its input 52 which directs such prefiltered air into the interior of a non-rotating drum 54. The interior surface of the non-rotating drum 54 is provided with a fur-like filtering media 56 of sufficient porosity to permit clean air, but not the dust or finer fiber or lint particles to pass therethrough, to exterior of the drum and into the housing 58. In this manner, the air input to the drum must pass through this fur-like material entrapping the finer particles in the filter media.

The drum 54 of the secondary filter 50 is fixedly positioned in the housing 58 and has a vacuum manifold 60, rotatably positioned axially therein. The vacuum manifold is provided with rotatable vacuum heads 62 which rotate in proximity to the filtering media 56 to continuously vacuum off particles entrapped in the filtering media 56.

The axial vacuum manifold 60 and vacuum nozzle heads 62 are driven through a DC motor 64 which is of a variable speed. Also located adjacent the secondary filter is a vacuum pump and stripper fan 66 for creating the vacuum in the manifold to clean the filtering media. A suction fan 70 is also provided for removing the clean air from the housing exterior the drum. This dust-ladened air may be filtered out of the air exterior of the secondary filter by any well-known precipitator or, in the preferred combination tandem mode, may be recirculated back through an aperture in the common wall of the primary and secondary filters into the primary filter 20 for entrapment in the bat formed by the larger particulate fibers and lint. Appropriate supports may be provided adjacent this aperture to support the contiguous ends of shaft 26 and manifold 60.

The clean air which moves through the filter media to exterior of the drum of the secondary filter remains within the chamber where it is vented to the atmosphere through line 74 through the action of a clean-air suction fan 70.

Also located within the secondary filter are a pair of sensor elements 80 and 84, L-shaped in configuration, with their exterior openings pointing downstream from the direction of air flow. They are located at the input end 76 and output end 78 of the secondary filter. The purpose of these sensors is to interact with the control circuitry for determining the pressure differential between the input and output and of the secondary filter. Their, purpose is to modify the speed of filter cleaning in response to variations beyond pre-set limits.

As can be understood, if the particle-ladened air is ladened with dust to a higher-than-normal degree, it will rapidly clog the filtering media. In such circumstances, a good flow of air will not occur through the primary filter since the air will be presenting particles at too rapid a rate. As a result, the pressure at the output end will exceed the pressure at the input end of the secondary filter by greater than a predetermined acceptable amount as determined by the sensors and associated control means. This undesirable circumstance will be relieved, and an acceptable condition restored by the increased cleaning of the filter. This is accomplished by accelerating the filter cleaning through the vacuuming action by speeding up variable speed DC motor DCI to accelerate the motion of the rotating vacuum manifold 60 and heads 62. The increased rotational speed will clean the filtering media 56 more rapidly and permit a greater air flow through the drum to thereby decrease the pressure differential.

If, on the other hand, there were a lower-than-normal amount of particles in the air to be cleaned, the pressure differential would be sufficiently decreased, as through relatively clean air being fed to the secondary filter, then the efficiency of the secondary filter would permit a reduction in an energy input to the system through a reduced speed of motor 64 and a reduced speed of rotation of the motor 64 and vacuum heads 62. The reduction of speed would preferably continue until it stopped even though filtering could continue.

Further, in the state where excessively dirty air were being fed to the secondary filter and clogging of the filtering media occurred with rapidly increasing pressure differentials, the clogging could reach such a state that the increased speeds of the vacuum head were insufficient to keep up with the removal of the dust. As a result, the clutch and drive belt would slip to create even greater increased pressure differentials. In such case, it would be desirable, upon reaching and detecting the emergency high pressure condition, to turn the machine off immediately or to turn on an alarm light to warn the operator. Such concepts of filter machinery control are equally applicable to primary filters as well as secondary filters and to filters of design other than those disclosed in the primary embodiment except that the speed of rotation of filtering drum 24 would be varied through variable speed DC motor 34 rather than varying the speed of the manifold 60 and heads 62.

Figure 4:
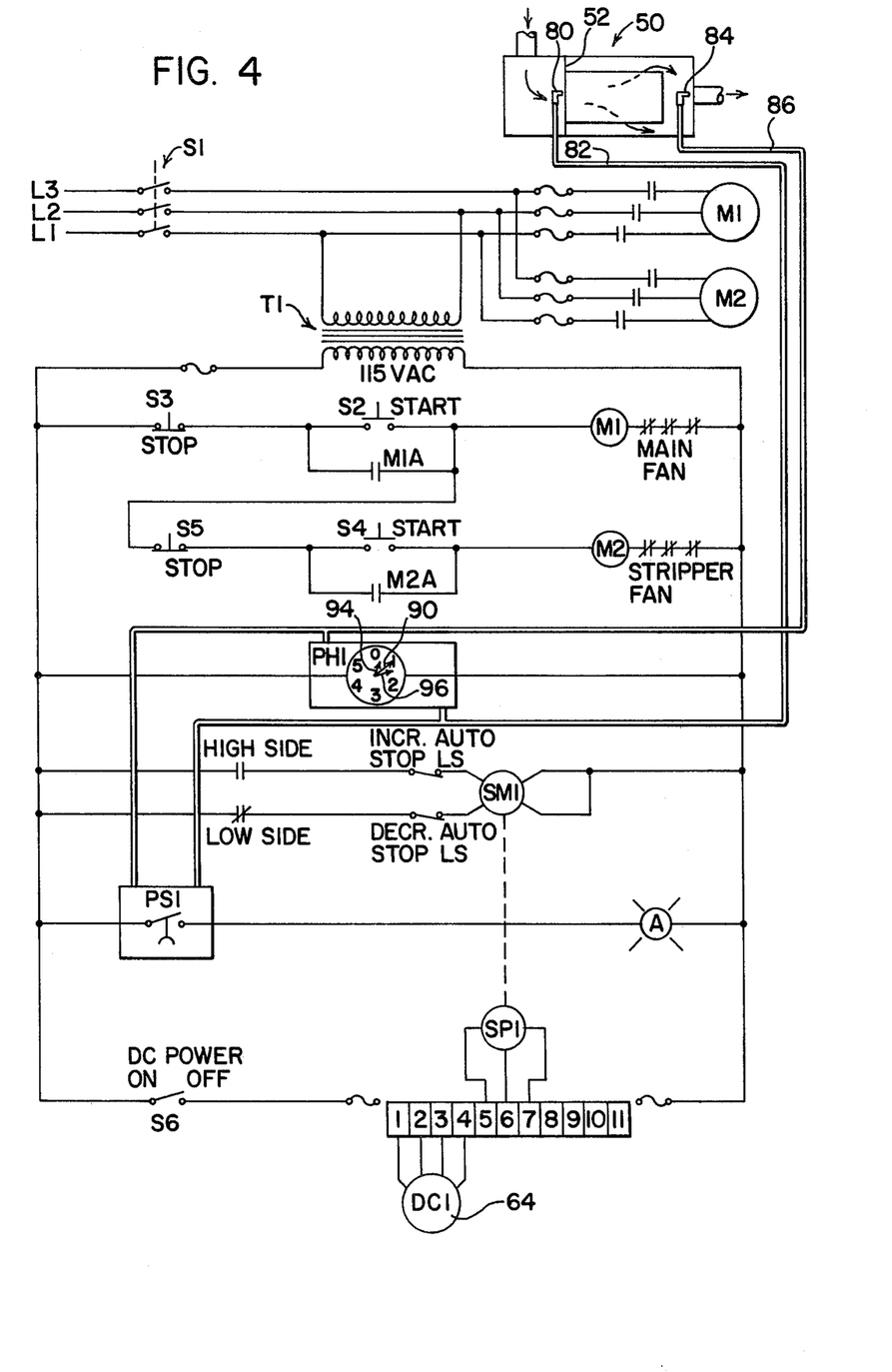
FIG. 4 is an electrical schematic of the control mechanisms as may be utilized in either the primary or secondary filter of FIG. 1.

In the secondary filter for example, as shown in the preferred embodiment, note FIG. 4, the high pressure sensor 80 is coupled through pneumatic line 82 to the input end 52 of the secondary filter. This input is set to the automatic control panel at the operator console. Similarly, the low pressure sensor 84 is coupled through the pneumatic line 86 to the same control panel. The pressure lines are coupled to appropriate ports of a photohelic switch, PH1. The coupling is through "T" connections, the purpose of which will be described later. In the photohelic switch, there are electrical components which make up the key elements of the electronic package of the system.

Power is directed to the photohelic switch and other elements of the electrical controls, as shown in FIG. 4, through the closing of a main disconnect switch S1. Power to the controls is brought through the transformer T1 to set up the power across the photohelic switch and the various other functioning elements including the electrical line containing the coil of motor M1 and its heating elements. These are electrically energized upon the depression of the start switch S2 which completes that line.

In addition to the switch S1, and on the lines L1, L2 and L3 are a series of fuses and contacts for the starters of motor M1 and M2.

Depression of the start switch S2 maintains main suction fan motor M1 in its operating state. The depression of S2 also pulls in holding contact relay M1A to activate and maintain suction fan M1 or 70 in the secondary filter machine. This also causes the main flow of air through the secondary filter. Stoppage of this motor can be effected through the depression of the stop switch S3 or the main disconnect S1.

Figure 5:
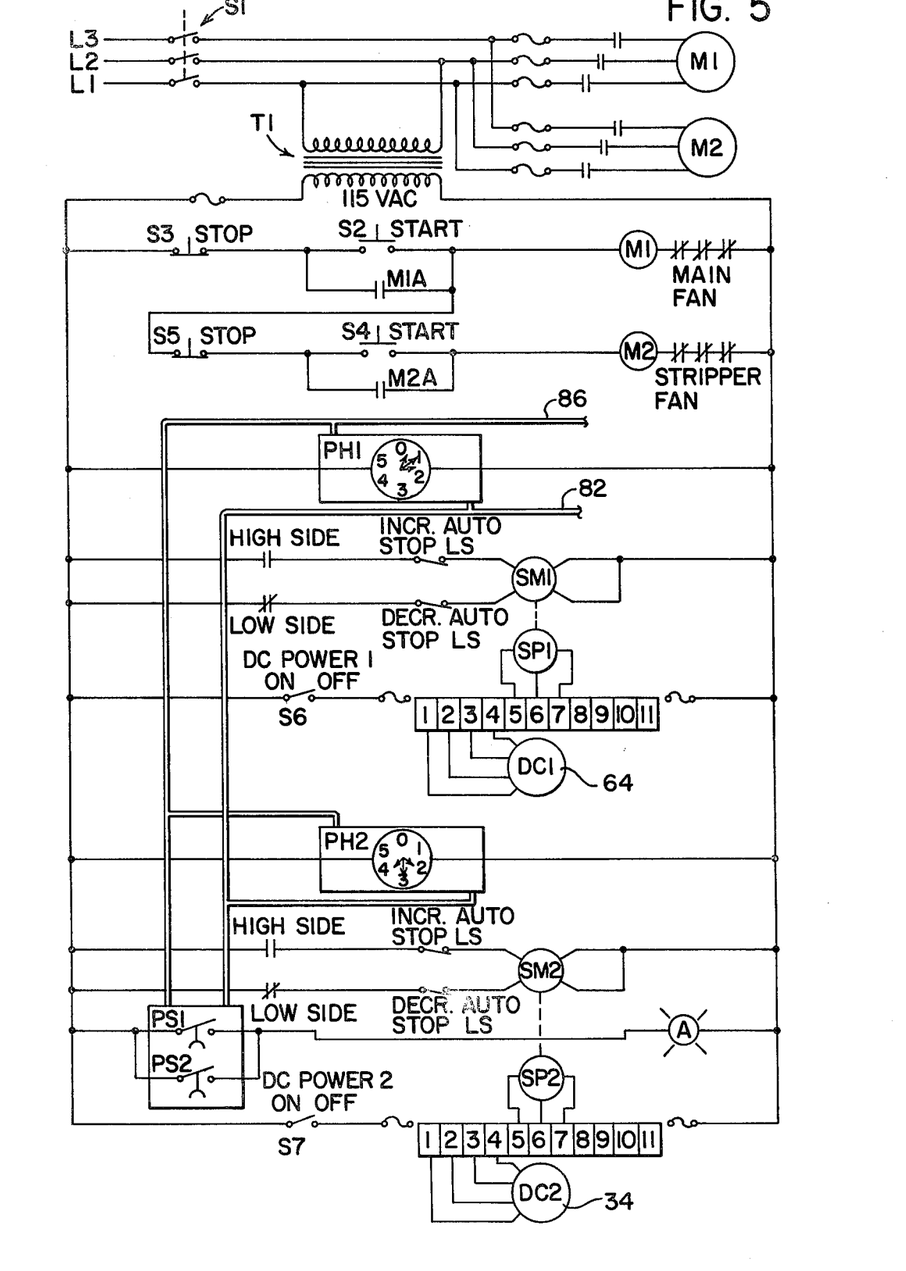
FIG. 5 is an electrical schematic of the control mechanisms in tandem utilized for controlling both the primary and secondary filters as shown in FIG. 1.

Power to the electrical line containing the main fan motor will also bring power to the coil of motor M2 and its associated heaters. Motor M2 of FIGS. 4 and 5 represents the stripper fan. Power is effected to the stripper fan through the start switch button S4. Start switch button S4 is located so that upon depression it will activate the stripper fan and close the holding contact relay M2A. Removal of power from the stripper fan can be effected by depressing the stop switch button S5 or, in the alternative, by depressing stop switch button S3 or the main disconnect S1. The function of the stripper fan is to provide the vacuum to the vacuum manifold rotating within the fixed drum containing the filter media.

Power to the system, as mentioned above, energizes the photohelic switch which receives information from pneumatic lines 82 and 86 with regard to pressure differentials across the filter. The pressure differential information is brought through lines 82 and 86 through which it is coupled. The photohelic switch includes a dial to indicate the pressure drop between the input and output ends of the air filtering machinery being monitored. This pressure differential can be read through a variable needle 90 to indicator on the face of the photohelic switch at the operator console for reading the actual pressure drop.

Also on the face of the dial of the photohelic cell are a pair of operator positional needles 94 and 96. During normal operations it may be desirable to operate the cleaning function below the low set needle point of needle 94. Further it is not desirable to operate the filtering machinery above the high set needle 96.

During normal operations the variable needle cycles past both the low and high pressure needles as the filter media is contaminated and cleaned. After first passing the low set needle and then the high set needle, photohelic switch PH1 gives off a signal to close the high side switch to start the auto stop limit switch and activate servomotor SM1 to drive up the speed potentiometer SP1 in the SCR control and to thereby increase the speed of the DC motor, DC1, rotating the vacuum manifold. When the pressure differential then falls below the high set needle the speed of the DC motor is held until the variable needle falls below the low set needle. During this time the filtering is achieving its results at a higher filtering rate due to a higher speed of rotation of the vacuum manifold and the cleaning is faster than the contamination. This continuing self-cleaning continues to occur until the variable needle falls below the low set needle at which time filtering continues but the rotation of the manifold continues to decrease until its motion is discontinued.

When the variable needle falls below the low set needle, the low side limit switch is activated along with the decreased auto stop limit switch to continuously slow down the speed of rotation of the vacuum manifold until it stops DC motor, DC1.

Also in the electrical circuit is a DC power switch S6 which must be activated along with S1, S2 and S4 prior to operating the system.

The closing of switch S6 brings appropriate DC power to the circuit board containing the electrical control elements within the photohelic cell PH1, the servomotor SM1 and the speed potentiometer SP1. In this manner, the closing of switch S6 permits power to be applied to the DC motor, DC1. Also coupled to the high pressure and low pressure lines 82 and 86, through the aforementioned "T" connections are pneumatic extension lines going to elements of a supplemental safety feature of the system.

Coupled through aforementioned "T" lines at the photohelic cell, the lines continue to pressure switch PS1 to sense excessive pressure differentials between the input and output ends of the filtering machinery. This function is to be a warning in the event of a choke-up or binding of the elments of the filtering system for any reason. If, for example, the photohelic switch were to be set with the low and high pressure needles at $\frac{1}{2}''$ and $1\frac{1}{4}''$ respectively, it may be desirable to set the pressure switch PSI at $2\frac{1}{2}''$ of mercury for being activated upon this excess pressure differential. In the event that the variable needle senses pressure in this excessive $2\frac{1}{2}''$ range, pressure switch PS1 will likewise receive the indication of the excess pressure to close pressure switch PS1 and permit power to be brought across this line to activate an amber warning light A as an indicator to the operator of the system of the malfunction. The machine can then be shut off by the operator. In the alternative, the amber light could be replaced by a servo electronic system to shut off the machine automatically, or to ring a bell or issue some sort of additional warning or control function to protect the machinery.

As can be understood, the electrical controls as described hereinabove are for use with a secondary filter of the type described in the instant preferred embodiment. A similar control circuit could be utilized in the primary air filter alone except the fans M1 and M2 may obviously be eliminated. This is in fact the case in this primary filter embodiment. The variable speed DC motor, 34, would merely rotate the filtering drum at varying speeds.

In the dual filter embodiment mode, two variable speed DC motors would be needed for rotating both the vacumm manifold with its vacuum nozzles as well as the screened drum with its various doffing and cleaning rollers at variable speeds as determined by the photohelic switch, the servomotor and speed potentiometer substantially as shown with regard to the FIG. 4 and FIG. 5 electrical schematic descriptions.

Actually, in the preferred dual filter embodiment, a composite circuit is preferably utilized for controlling both a primary and secondary filter. As can be seen, the upper portion of the FIG. 5 electrical schematic is substantially the same as that described with respect to FIG. 4. The pneumatic high pressure and low pressure lines 82 and 86 lead from the air filtering machinery to the second photohelic switch and a second pressure switch PS2, in the same fashion as the FIG. 4 embodiment. Similarly, from the primary filter, the operation is modified by having a duplicate servomotor SM2, a duplicate speed potentiometer SP2, and a duplicate variable speed DC motor DC2 for modifying the speed of rotation of the drum 24 and other related filtering mechanisms of the primary filter. Also in parallel with the emergency pressure switch 1 would be a second emergency pressure switch PS2 with a second power on-off switch S7.

By having the tandem controlling mechanisms in the primary and secondary filters, the smoothness of operation and the total efficiency of each is increased along with the efficiency of the system for maximized efficiency of the air filtering function. It is understood, however, that the controls could readily be utilized in either the primary or secondary filters alone, whether or not the primary and secondary filters are utilized in tandem, or whether or not different types of primary and secondary filters are utilized for the air filtering function.

While the instant invention has been described with regard to a particular embodiment thereof, it is not intended to be so limited but it is intended to be covered broadly within the spirit and scope of the appended claims.

I claim:

1. An air filtering system comprising
   a housing having an inlet for receiving particle ladened air to be filtered and an outlet for discharging cleaned air therefrom;
   filter means mounted within the housing to receive therethrough a flow of air passing from the inlet to the outlet and for retaining filtered particles from the air moving through the filter means;
   moveable mechanisms mounted within the housing for movement adjacent the filter means for the removal of filtered particles from said filter means;
   drive means to move said moveable mechanisms;
   first sensor means positioned adjacent the inlet to sense the air flow thereacross and second sensor means positioned adjacent the oulet to sense the airflow thereacross for determining the air pressure diffferential between the input and outlet of the system;
   and means coupling said first and said second sensor means to the drive means to modify the speed of motion of the moveable mechanisms in response to a change in air pressure as determined by said first and second sensor means.

2. The system as set forth in claim 1 wherein said filter means is a rotatable filtering drum and said moveable meachanisms include a doffing roller rotatable adjacent the exterior surface of said rotatable filtering drum.

3. The system as set forth in claim 1 wherein said filtering means is a fixed drum and said moveable mechanisms include a vacuum manifold and vacuum heads rotatable adjacent the internal surface of the fixed filtering drum.

4. In combination, a housing having an inlet for receiving particle ladened air to be filtered and an outlet for discharging cleaned air therefrom; a primary filter means mounted within said housing and adapted to receive and filter particle ladened air passing therethrough from the inlet and to discharge filtered air in a cleaner condition, a secondary filter means also mounted within said housing and positioned and arranged to receive the discharged filtered air from the primary filter means and to further filter the filtered air passing therethrough and to discharge therefrom clean air through the outlet, moveable filter cleaning means mounted within the housing adjacent at least one of said filter means to remove filtered particles from at least one of said filter means, drive means to move said filter cleaning means adjacent said at least one filter means, the improvement comprising control means mounted in operative association with said drive means and said at least one filter means for determining the pressure differential across said at least one filter means and to modify the speed of said drive means in response to a predetermined pressure differential across said at filter means.

5. The combination as set forth in claim 4 and further including additional control means mounted in operative association with said filtering means.

6. The combination as set forth in claim 4 and further including means to return at least a portion of the output from the secondary filter means to the primary filter means for further filtration.

* * * * *

UNITED STATES PATENT AND TRADEMARK OFFICE
CERTIFICATE OF CORRECTION

PATENT NO. : 4,461,633
DATED : July 24, 1984
INVENTOR(S) : Paul W. Bodovsky

It is certified that error appears in the above-identified patent and that said Letters Patent are hereby corrected as shown below:

Column 8, line 39, after at, insert ---least one---.

Signed and Sealed this

Nineteenth Day of February 1985

[SEAL]

Attest:

DONALD J. QUIGG

Attesting Officer Acting Commissioner of Patents and Trademarks